(12) United States Patent
Büttner et al.

(10) Patent No.: US 10,404,113 B2
(45) Date of Patent: Sep. 3, 2019

(54) ROTOR OF A SYNCHRONOUS RELUCTANCE MACHINE

(71) Applicant: SIEMENS AKTIENGESELLSCHAFT, München (DE)

(72) Inventors: Klaus Büttner, Hollstadt (DE); Marco Cerny, Nüdlingen (DE); Matthias Warmuth, Windshausen (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 15/554,180

(22) PCT Filed: Jan. 7, 2016

(86) PCT No.: PCT/EP2016/050203
§ 371 (c)(1),
(2) Date: Aug. 28, 2017

(87) PCT Pub. No.: WO2016/146271
PCT Pub. Date: Sep. 22, 2016

(65) Prior Publication Data
US 2018/0083500 A1    Mar. 22, 2018

(30) Foreign Application Priority Data

Mar. 19, 2015    (EP) .................................. 15159862

(51) Int. Cl.
*H02K 1/24*      (2006.01)
*H02K 19/14*    (2006.01)
(Continued)

(52) U.S. Cl.
CPC .......... *H02K 1/246* (2013.01); *B22D 19/0054* (2013.01); *B22D 19/0081* (2013.01);
(Continued)

(58) Field of Classification Search
CPC .......... H02K 1/27; H02K 21/46; H02K 21/00; H02K 1/22; H02K 17/08; H02K 17/02;
(Continued)

(56) References Cited

U.S. PATENT DOCUMENTS 2,643,350 A * 6/1953 Merrill ................... H02K 1/276
310/156.79
4,110,646 A * 8/1978 Rao ........................ H02K 1/246
310/163
(Continued)

FOREIGN PATENT DOCUMENTS

CN     1241310 C     2/2006
DE     27 45 629 A1  4/1979
(Continued)

OTHER PUBLICATIONS

Russian Search Report dated Apr. 13, 2018 with respect to counterpart European patent application 2017134032/07 (060086).
(Continued)

*Primary Examiner* — Quyen P Leung
*Assistant Examiner* — Leda T Pham
(74) *Attorney, Agent, or Firm* — Henry M. Feiereisen LLC

(57) ABSTRACT

A rotor designed as a reluctance rotor includes a laminated core which defines an axis and has end faces. The laminated core includes sheets which are at least partly axially layered, with the sheets having flux-conducting portions and flux-blocking portions to form a specified number of poles. A cage made of electric conductors runs in a substantially axial direction and is connected at the end faces of the laminated core by short-circuit rings. The conductors are located in a radially outer region of at least some of the flux-blocking portions arranged one behind another substantially in the axial direction, with the conductors defining conductor bars
(Continued)

formed by conductive material at a quantity determinative to define an internal diameter of the conductor bars.

21 Claims, 3 Drawing Sheets

(51) Int. Cl.
*H02K 15/00* (2006.01)
*H02K 15/02* (2006.01)
*H02K 17/16* (2006.01)
*B22D 19/00* (2006.01)

(52) U.S. Cl.
CPC ....... *H02K 15/0012* (2013.01); *H02K 15/022* (2013.01); *H02K 17/165* (2013.01); *H02K 19/14* (2013.01)

(58) Field of Classification Search
CPC .......... H02K 17/26; H02K 1/24; H02K 21/24; B22D 19/00
See application file for complete search history.

(56) References Cited

U.S. PATENT DOCUMENTS

| | | | | |
|---|---|---|---|---|
| 4,568,846 | A * | 2/1986 | Kapadia | H02K 21/46 310/156.83 |
| 4,795,936 | A | 1/1989 | Crosetto et al. | |
| 5,296,773 | A * | 3/1994 | El-Antably | H02K 1/246 310/106 |
| 5,893,205 | A * | 4/1999 | McClelland | H02K 1/246 29/598 |
| 7,112,908 | B2 * | 9/2006 | Takita | H02K 19/14 310/156.53 |
| 8,836,193 | B2 | 9/2014 | Büttner et al. | |
| 8,963,394 | B2 | 2/2015 | Büttner et al. | |
| 9,154,017 | B2 | 10/2015 | Büttner et al. | |
| 9,252,642 | B2 | 2/2016 | Büttner et al. | |
| 9,257,883 | B2 | 2/2016 | Büttner et al. | |
| 9,281,728 | B2 | 3/2016 | Büttner et al. | |
| 9,287,754 | B2 | 3/2016 | Büttner et al. | |
| 9,515,536 | B2 | 12/2016 | Büttner et al. | |
| 2003/0173861 | A1 | 9/2003 | Kawaguchi et al. | |
| 2003/0184185 | A1 | 10/2003 | Yoshino | |
| 2006/0108888 | A1 * | 5/2006 | Jung | H02K 1/246 310/211 |
| 2012/0133236 | A1 | 5/2012 | Büttner et al. | |
| 2013/0187512 | A1 | 7/2013 | Büttner et al. | |
| 2014/0217840 | A1 | 8/2014 | Büttner et al. | |
| 2015/0042185 | A1 | 2/2015 | Büttner et al. | |
| 2015/0207378 | A1 | 7/2015 | Büttner et al. | |
| 2015/0214810 | A1 | 7/2015 | Büttner et al. | |
| 2015/0349616 | A1 | 12/2015 | Büttner et al. | |
| 2015/0372546 | A1 | 12/2015 | Büttner et al. | |
| 2016/0056673 | A1 | 2/2016 | Büttner et al. | |
| 2016/0056674 | A1 | 2/2016 | Büttner et al. | |

FOREIGN PATENT DOCUMENTS

| | | |
|---|---|---|
| DE | 10 2014 201 740 A1 | 8/2014 |
| EP | 2793362 A1 | 10/2014 |
| GB | 2 023 459 A | 1/1980 |
| JP | S5851759 A | 3/1983 |
| JP | H10271779 A | 10/1998 |
| JP | H11146615 A | 5/1999 |
| SU | 1307508 A1 | 4/1987 |
| WO | WO 2014-166555 A2 | 10/2014 |

OTHER PUBLICATIONS

Translation of Russian Search Report dated Apr. 13, 2018 with respect to counterpart European patent application 2017134032/07 (060086).

* cited by examiner

ROTOR OF A SYNCHRONOUS RELUCTANCE MACHINE

CROSS-REFERENCES TO RELATED APPLICATIONS

This application is the U.S. National Stage of International Application No. PCT/EP2016/050203, filed Jan. 7, 2016, which designated the United States and has been published as International Publication No. WO 2016/146271 A1 and which claims the priority of European Patent Application, Serial No. 15159862.0, filed Mar. 19, 2015 pursuant to 35 U.S.C. 119(a)-(d).

BACKGROUND OF THE INVENTION

The invention relates to a rotor, in particular a synchronous reluctance machine which can be operated directly on the electric supply network, wherein the rotor has an axis and the rotor is provided with sheets which are at least partly axially layered, wherein the rotor is designed as a reluctance rotor which has a specified number of rotor poles formed by flux-conducting portions and in particular non-magnetic flux-blocking portions of the individual sheets, wherein the rotor has at least one cage which is made of electric conductors that run in a substantially axial direction and are connected at the end faces of the rotor by respective short-circuit rings.

Furthermore, the invention relates to a synchronous reluctance machine and a method for manufacturing a rotor of a synchronous reluctance machine.

The rotors of rotational dynamo-electric reluctance machines are laminated and anisotropic in construction. Flux-conducting portions and flux-blocking portions are arranged in the contour of the individual sheets for magnetic flux. As a result, the fluxes in the magnetic axes d and q are different. The rotor therefore has pronounced poles. These poles are the result of different inductances being designed in the d and q axis of the rotor. The surfaces of the rotor, for example, have a serrated structure or flux barriers are stamped into the sheets of the rotor.

Thus, for example, U.S. Pat. No. 4,795,936 A1 shows a rotor in which the inductances of the rotor are altered by means of recessing. The center of the d axis is thus provided with magnetically soft material and is available as a flux path. This construction generates different magnetic resistances in the magnetic d and q axis of the rotor, thus forming pronounced poles of the rotor there. The inductance of the d axis is greater than the inductance of the q axis. The magnetic resistances in these axes are therefore also different in design. The difference in the inductance thereof is significant for the torque yield of the reluctance machine. To also be able to start a synchronous reluctance motor on an electric supply network e.g. 400 volts, 50 Hz and directly synchronize it with the mains frequency, a squirrel cage must also be provided in the rotor for a direct start-up.

Thus, for example, US 2006/0108888 A1 shows a rotor with short-circuit rods. The rods are separated by bars of the flux barriers in the sheet of the rotor. Local conductor bars are thus present. However, these bars have a negative effect on the properties of the reluctance rotor as part of the magnetic flux in this region is closed and can no longer contribute to torque formation. This reduces the efficiency as well as the power density of the synchronous reluctance machine.

Likewise, a reluctance rotor with completely filled flux barriers is known from WO 2014/166555 A2. The increased material input increases the inertia and the costs of the rotor. Furthermore, when using a die casting process, external support of the sheet geometry is necessary during the casting process as the tensile strength of the radially external bars of the laminated core may be overloaded during casting as a result of the application of pressure in the flux barriers.

SUMMARY OF THE INVENTION

Based hereon, the object of the invention is to provide a rotor of a synchronous reluctance machine which can be produced in a simple manner and nevertheless ensures the direct start-up of a synchronous reluctance machine on an electric supply network.

The object in question is achieved in a rotor, in particular a synchronous reluctance machine which can be operated directly on the electric supply network, wherein the rotor has an axis, and the rotor is provided with sheets which are at least partly axially layered, wherein the rotor is designed as a reluctance rotor which has a specified number of rotor poles formed by flux-conducting portions and in particular non-magnetic flux-blocking portions of the individual sheets, wherein the rotor has at least one cage which is made of electric conductors that run in a substantially axial direction and are connected at the end faces of the rotor by respective short-circuit rings, such that the axially running conductors are located in the radially outer region of at least some flux-blocking portions arranged one behind the other substantially in an axial direction.

The object in question is also achieved by a method for producing a rotor, in particular a synchronous reluctance machine which can be operated directly on the electric supply network, wherein the rotor has an axis, and the rotor is provided with sheets which are at least partly axially layered, wherein the rotor is designed as a reluctance rotor which has a specified number of rotor poles formed by flux-conducting portions and in particular non-magnetic flux-blocking portions of the individual sheets, wherein the rotor has at least one cage which is made of electric conductors that run in a substantially axial direction and are connected at the end faces of the rotor by respective short-circuit rings, by the following steps:
  punching sheets with specified sheet geometry,
  axial packaging of these sheets to form a laminated core,
  casting of a specified quantity of electrically conductive non-magnetic material into a specified number of flux-blocking portions and simultaneous rotation and/or tumbling of the rotor in an auxiliary device.

The electrical conductors of the existing squirrel cages of the rotor are on the radially external ends of at least some flux barriers of the laminated core of the rotor. Inter alia, this ensures the efficient ramp-up of the reluctance machine directly on an electric supply network—hence, also without electrical intermediate inverters.

The electrically conductive non-magnetic materials provided as conductors are pure aluminum (aluminum 99.7), aluminum alloys, copper, copper alloys, conductive material bound in plastic or resin, non-ferrous metals in powdered form in plastic or resin, as well as carbon nanotubes in plastic or resin, preferably with thin short fibers.

Preferably the material of these conductors is a metal and/or a metal alloy. According to an embodiment of the invention, in at least one area the conductor comprises at least one of the following materials respectively: copper, aluminum, magnesium, an alloy, here preferably an aluminum alloy, in particular silumin.

The flux-conducting portions are separated from one another in a known way by non-magnetic flux-blocking areas. The flux-blocking portions are non-magnetic, i.e. in particular as a result of not being composed of ferromagnetic material, hence, for example, are punch-outs which contain air. In the rotor according to the invention, in a plurality or all of the flux-blocking areas an electrically conductive, non-ferromagnetic filler is arranged in the radially external areas of these flux-blocking portions. Electrically conductive is here taken to mean that the filler has a high electric conductance, in particular a conductance greater than $10^5$ S/m (Siemens per meter), preferably greater than $10^6$ S/m.

In connection with the invention, a non-ferromagnetic material is, for example, a completely non-magnetic material, for example, a ceramic with carbon nanotubes or a polymer with carbon nanotubes, or a paramagnetic or diamagnetic material.

To influence the torque ripple of the rotor of the synchronous reluctance machine, hence to influence the ripple smoothing, preferably the poles of the rotor viewed over the axial length are beveled, skewed or staggered. It is, of course, important to ensure that the manufacturing process of the axially running conductors, as subsequently described, is ensured by means of a bevel or staggering and a cage can be created within the rotor. It is important that axially continuous conductors are also available for a bevel or staggering.

The rotor according to the invention is, in particular, produced by placing the axially packaged laminated core of the rotor in an auxiliary device, a short-circuit ring shell is attached to an end face and this is filled to a specified level with the electrically conductive non-magnetic material in liquid form.

Likewise, short-circuit ring shells can also be attached to both end faces of the laminated core which are filled to a specified level with the electrically conductive non-magnetic material in liquid form.

As a result of this conductive material flowing into the flux barriers and a subsequent and/or downstream centrifugal casting method, this material within the provided flux barriers is then forced into the radially external areas of these flux barriers where it cures and thus forms at least one short-circuit rod—in other words, an electrical conductor—at the radially external edges of the flux barriers.

To prevent premature curing of the electrically conductive material in the flux barriers, the laminated core of the rotor is preheated and/or heated during the process.

As a result, the conductive material remains in its liquid state for longer and can thus be better positioned as part of the production process, in particular, by the centrifugal forces within the respective check valve.

The rotor according to the invention now has a reduced mass compared to comparatively produced rotors and thus a reduced moment of inertia. This also leads to savings in resources. Furthermore, the production of the lamination—in other words, the provision of an appropriate punching tool—is also comparatively simple as there is no need for partitions or bars between the grooves of the conductors and flux-conducting portions in the sheets. The cross-sections of the conductors, in other words, the cross-sections of the rods of the cage are only adjusted by the volume of the conductive, castable material used and/or by the internal diameter of the short-circuit ring shells.

The magnetic flux, like the efficiency of the reluctance machine, is not negatively influenced according to the invention by the presence of supporting bars within the laminated core.

The method for the production of a rotor according to the invention is suitable for the most diverse rod cross-sections and number of poles. Thus, it is possible according to the invention to produce a synchronous reluctance motor with a single rotor lamination with or without a cage.

The rotor according to the invention has the advantage that the flux-blocking areas or flux-blocking portions with the filler arranged therein form cage bars of a squirrel cage and are thus integrated in the reluctance rotor according to the invention. Together with short-circuit rings and the cage bars, the rotor cage can now start a synchronous reluctance motor asynchronously, or in a simple manner compensate for load fluctuations which prevent the rotor from running synchronously. After an asynchronous start-up, ramp-up or load fluctuations, the rotor therefore runs independently in synchronous operation. The rotor is therefore a rotor of a synchronous reluctance machine with much greater efficiency or higher power density than a comparable asynchronous motor as almost no losses occur in the rotor. In synchronous rotary operation, hence when the rotor rotates with the rotational frequency of the magnetic stator rotating field, there is no relative movement/slip of the stator field to the rotor field, respectively no induction in the rotor bars of the rotor cage.

Through the choice of filler of the conductor—hence of the electrical resistance configurable—the option of optimizing the start-up behavior of the rotor regardless of its synchronous rotation behavior is therefore also possible. The filler is preferably so stiff in the cooled state that it also stabilizes the rotor against centrifugal forces so that the rotor is designed for operation at a speed of more than 3000 rpm (revolutions per minute), in particular more than 7000 rpm.

According to a development of the invention, an electrically conductive and non-ferromagnetic disk is respectively arranged at opposite axial ends of the packet of the laminated core, by means of which the cage bars are electrically connected and the disks hereby form the short-circuit ring of the cage rotor. The disks can be advantageously provided by a die casting process or an injection molding process with minimal effort. The disks can be formed from the respectively used filler of the conductors.

Another option for adjusting the electrical resistance of the rotor cage realizable with minimal effort is produced according to an embodiment in which a respective effective cross-sectional area of a conductor of the disks between two conductors, hence cage bars, is so small that the disks in the cross-sectional area of the conductor each has a greater electrical resistance than the conductors or cage bars. For example, the thickness of a disk measured in an axial direction may be so small that the current path in a transition from one cage bar to the next has a greater electrical resistance in the disk than in the cage bars. The disks may also be designed as a short-circuit ring, hence with a recess, whereby the cross-sectional area of a conductor can also be established.

According to an embodiment, within the laminated cores at least one intermediate disk is also provided axially which may likewise comprise the material of the conductor bars or the material of the two disks at the end faces of the laminated core ends. This has the advantage that the mechanical rigidity of the rotor is increased, thus enabling a higher rotor speed. Furthermore, a predeterminable staggering can thereby be created in a simple manner between two axial consecutively arranged laminated-core assemblies of the rotor. An offset of up to a pole pitch can therefore be established between axially adjacent poles of the rotor.

The material of the conductors and the short-circuit rings of these conductors at the end faces of the laminated core ends are cast to form a firm bond by means of the conductive material, which enables a particularly simple design of the rotor in a dynamoelectric machine.

Lastly, an electric drive arrangement which has a dynamoelectric machine with a rotor according to an embodiment of the invention is also provided by the invention. The dynamoelectric machine is designed for operation as a synchronous reluctance motor or as an asynchronous motor. An advantage of the dynamoelectric machine is that it can be started in asynchronous operation and can be operated highly efficiently in synchronous operation. In the case of an asynchronous motor, the advantage is that under a low load the rotor can also fall into step with the stator rotating field, hereby resulting in synchronous reluctance operation and thus minimizing the electrical losses in the rotor.

In the simplest case, the electric drive arrangement is an individual dynamoelectric machine. However, the drive arrangement according to the invention may also comprise several dynamoelectric machines, hence in addition to the dynamoelectric machine described, at least one other dynamoelectric machine with one rotor respectively can be provided, constituting an embodiment of the rotor according to the invention. All the machines in this embodiment are connected to a shared inverter. In such a group drive, as a rule there is the problem of ensuring synchronous operation for all the dynamoelectric machines with the shared inverter. In the drive arrangement according to the invention this problem does not exist as a "rotor falling out of step" accelerates to the synchronous speed again independently by means of its squirrel cage.

In the drive arrangement it is also possible to provide that one of the dynamoelectric machines has a rotor which is not designed according to the invention. The inverter can then be designed for synchronous operation for this one electrical machine. All other electrical machines can then likewise be operated by this inverter as a result of their ability to also start asynchronously.

BRIEF DESCRIPTION OF THE DRAWING

The invention and further advantageous embodiments of the invention are described in more detail with reference to some exemplary embodiments; the diagrams show.

DETAILED DESCRIPTION OF PREFERRED EMBODIMENTS

Figure 1:
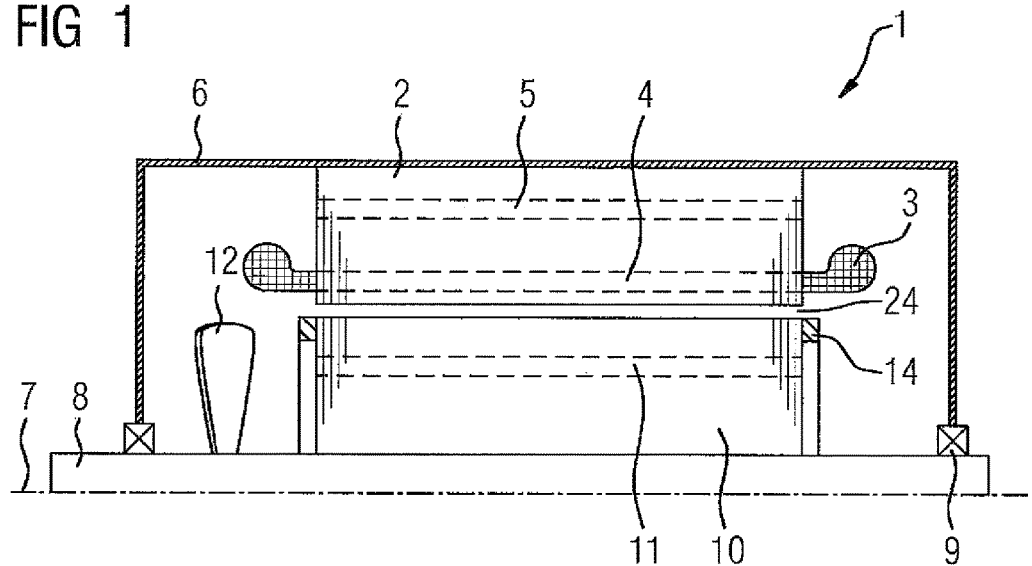
FIG. 1 a partial longitudinal section of a synchronous reluctance machine,
FIG. 2 a cross section of a rotor,
FIG. 3 a perspective view of a longitudinal section of a rotor,
FIG. 4 a perspective view of a rotor,
FIG. 5 a cross section of a rotor, and
FIG. 6 a principal procedural step in the production of a rotor.

FIG. 1 shows a partial longitudinal section of a synchronous reluctance machine having a stator 2 which is laminated in an axial direction, wherein winding heads 3 are arranged in the end faces of the stator 2 which are part of a winding system not shown in more detail, which is arranged in grooves 4 of the stator 2. A rotor 10 is separated by an air gap. The rotor 10 is, as described in more detail hereinafter, a reluctance rotor with a short-circuit ring 14 at each end face of the rotor 10. This short-circuit ring 14 is part of conductor bars not shown in this diagram which are located in corresponding recesses of the rotor 10. Electromagnetic interactions take place between the stator 2 and the rotor 10 which lead to a rotation of the rotor 10 and consequently the shaft 8 around the axis 7.

The stator 2 is in a housing 6 which in turn is supported on the shaft 8 by means of a bearing 9. To ensure sufficient cooling, a fan 12 is shown in principle which enables an exchange of air and thereby an exchange of heat of the reluctance machine 1 by way of indicated axial coolant channels 11 in the rotor 10 or coolant channels 5 in the stator 2.

Figure 2:
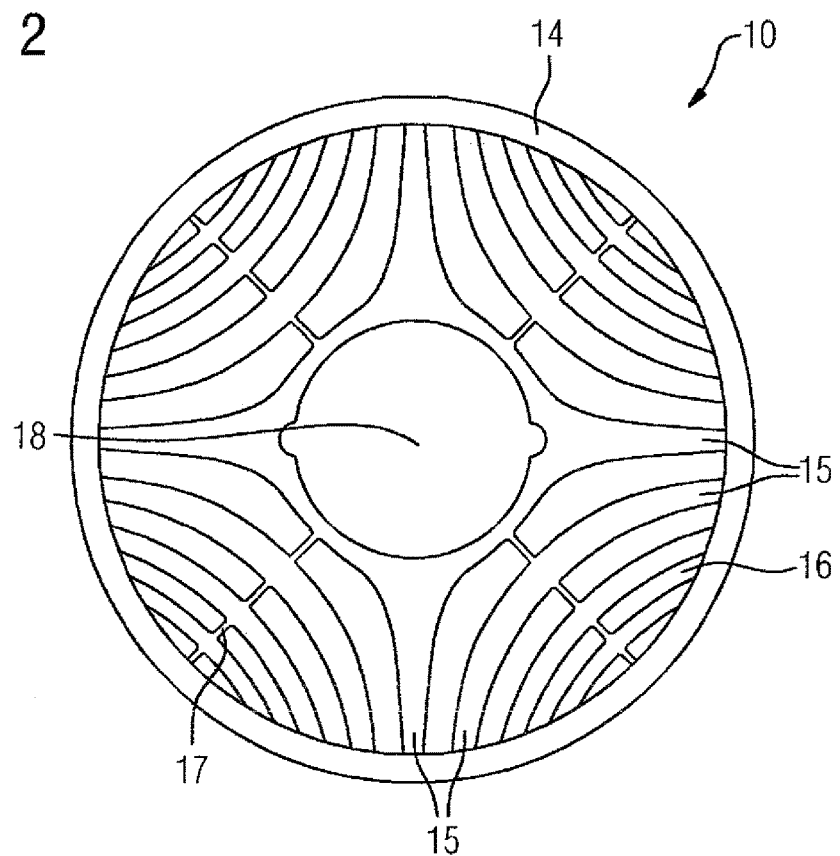

FIG. 2 shows a lateral view of the rotor 10 which in this embodiment has four poles, wherein the four-pole status is provided by an arrangement of flux-conducting portions 15 and flux barriers 16. The flux barriers 16 in this embodiment have central support bars 17 to be able to absorb radial forces, in particular centrifugal forces during the operation of the reluctance machine 1. The shaft 8 is connected in a torque-proof manner to the rotor 10 by way of the shaft bore 18. The short-circuit ring 14 is in the radially external end of the rotor 10, in direct contact with the end face of the rotor 10.

However, the short-circuit ring 14 can also be arranged at a distance from the end face of the rotor 10 by providing intermediate elements which are arranged axially between the short-circuit ring 14 and the end face of the laminated core 13. These electrically non-conductive intermediate elements are removed after production or remain on the rotor 10.

Figure 3:
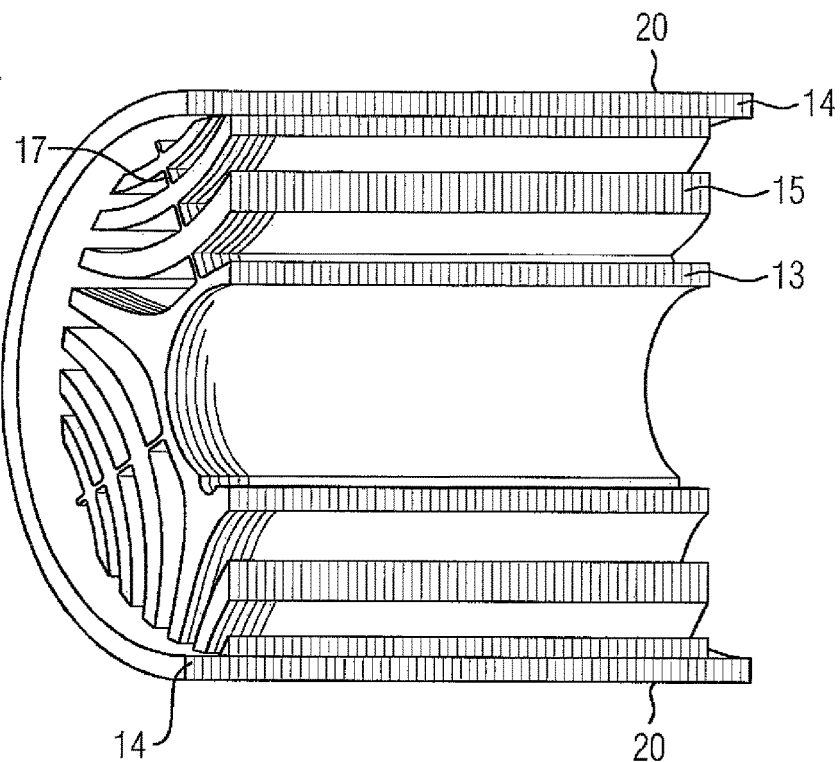

FIG. 3 shows a perspective view of the rotor 10 in a longitudinal section of the cut-open rotor 10, wherein unlike the above diagram for FIG. 2 it shows how the short-circuit ring 14 axially protrudes above the end face of the rotor 10 without being directly adjacent at the end face of the rotor 10. It also shows how starting from the short-circuit ring 14, the conductor bars 19 extend over the entire axial length of the laminated core 13 of the rotor 10.

Figure 4:
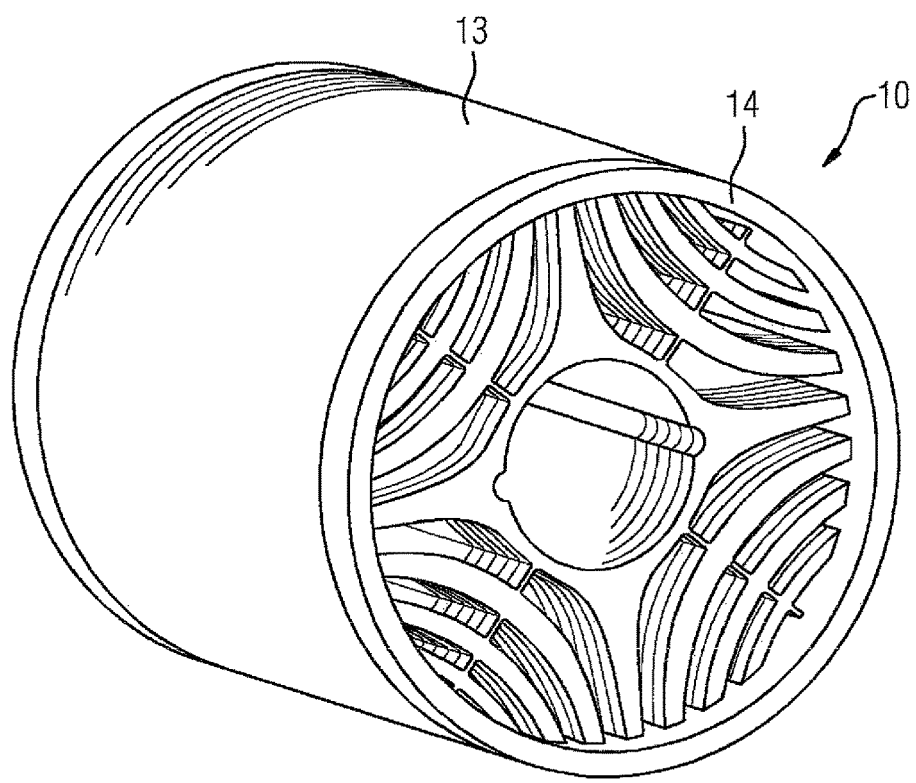

In addition to the previous figures, FIG. 4 now shows that in the area of the laminated core 13 the conductor bars 19 are within the radial supporting bars 20 and only the short-circuit rings 14 are now axially outside the laminated core 13 of the rotor 10.

Figure 5:
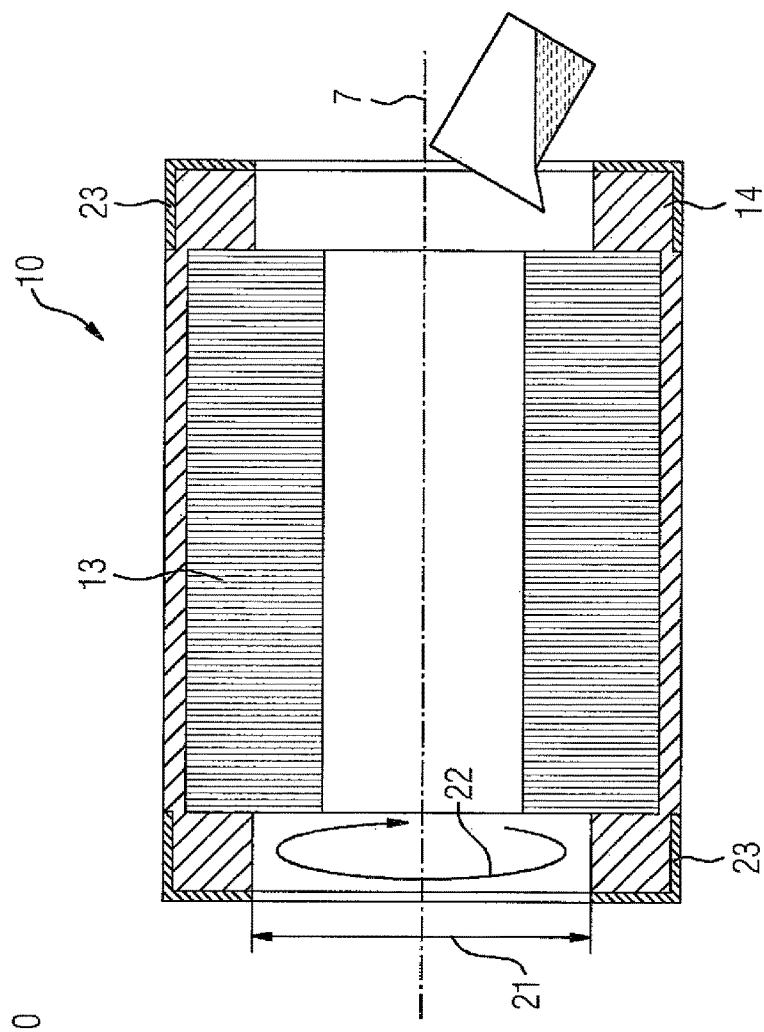
Figure 6:
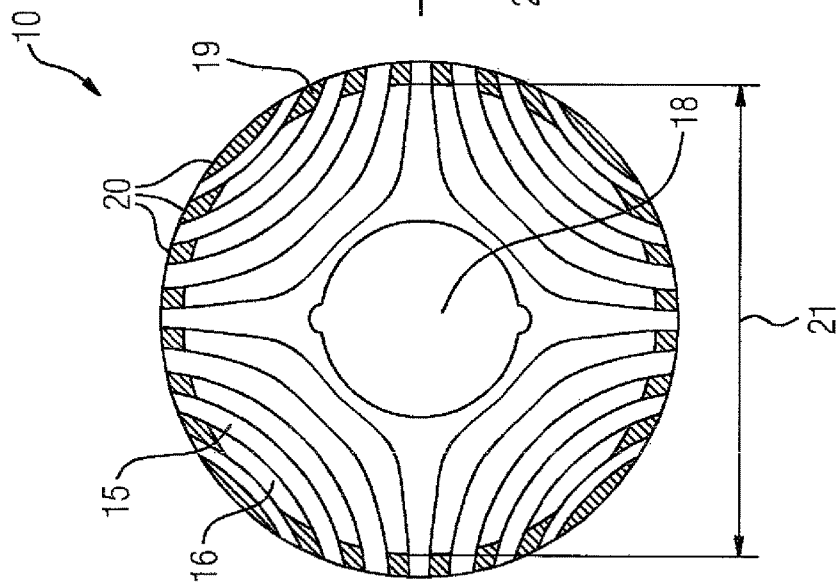

In a cross section of the rotor 10, FIG. 5 shows a further lamination section of a four-pole rotor 10 which shows flux barriers 16 without central supporting bars 17. Otherwise, the lamination section corresponds to the previous figures. A striking aspect is that according to the invention the conductive material is only found in the radially external ends of the flux-blocking portions 16. The conductive material now reached these outer points of the flux-blocking portion 16 by way of a method in principle shown in FIG. 6. Namely, by arranging a short-circuit ring shell 23 in the area of the short-circuit ring 14 which is flush with the end face of the rotor 10 and can thus be filled with an electrically conductive liquid material which is distributed over the axial length of the laminated core 13 of the rotor 10 of the respective flux-blocking portion 16.

By means of rotation 22 and/or tumbling of the device and thus of the laminated core 13 of the rotor 10, the fluid electrically conductive material is now distributed on the external radial edges of the flux-blocking portions 16. The cross sections of the conductor bars thus obtained are each specified by the amount of conductive material used, which in turn forms an internal diameter 21 of the conductor bars.

In addition, after the conductor material in the flux-blocking portions 16 has cooled, additional—similar or identical—filler can be put into the short-circuit ring shell 23 to achieve the desired cross section and/or the electrical conductivity of the short-circuit ring 14.

Such synchronous reluctance machines 1 are used in particular for fan or compressor drives, but also for group drives of varied application.

What is claimed is:

1. A rotor designed as a reluctance rotor, comprising:
   a laminated core defining an axis and having end faces, said laminated core having sheets which are at least partly axially layered, said sheets having flux-conducting portions and flux-blocking portions to form a specified number of poles; and
   a cage made of electric conductors running in a substantially axial direction and connected at the end faces of the laminated core by short-circuit rings, said conductors being located in a radially outer region of at least some of the flux-blocking portions arranged one behind another substantially in the axial direction so that each two of the conductors are located at two opposite ends of each of the flux-blocking portions as considered in a direction which is transverse to the axial direction, with the conductors defining conductor bars formed by conductive material at a quantity determinative to define an internal diameter of the conductor bars,
   wherein the cage has an outer circumferential surface, and the conductors extend to the outer circumferential surface of the cage and are exposed radially outwardly at the outer circumferential surface of the cage, and
   wherein each of the conductors has an outer circumferential surface coinciding with the outer circumferential surface of the cage and extending over a part of the circumferential surface of the cage.

2. The rotor of claim 1, constructed as a synchronous reluctance machine which is configured for operation directly on an electric supply network.

3. The rotor of claim 1, wherein the flux-blocking portions of the sheets are non-magnetic.

4. The rotor of claim 1, wherein the poles of the rotor are axially parallel, beveled or skewed in the axial direction.

5. The rotor of claim 1, wherein the laminated core has laminated-core assemblies arranged in axial staggered relationship, with the flux-blocking portions of the laminated-core assemblies being rotated about a specified angle such as to enable an axial design of an axially continuous electrical conductor.

6. The rotor of claim 1, further comprising a short-circuit ring shell configured to surround at least one of the short-circuit rings.

7. The rotor of claim 1, wherein each of the flux-conducting portions has two opposite ends extending to the outer circumferential surface of the cage and having outer circumferential surfaces coinciding with the outer circumferential surface of the cage so that the outer circumferential surface of the cage is formed by the outer circumferential surfaces of the flux-conducting portions and the outer circumferential surfaces of the conductors are arranged in alternating order without an intermediate element there between.

8. A method for producing a rotor, said method comprising:
   punching sheets with a specified sheet geometry;
   axially packaging the sheets so as to form a laminated core;
   casting a specified amount of an electrically conductive non-magnetic material into a specified number of flux-blocking portions of the sheets while simultaneously rotating and/or tumbling the laminated core in an auxiliary device;
   spinning the laminated core during the casting and/or thereafter around its axis at a speed sufficient to arrange the electrically conductive non-magnetic material at radially external edges of the flux-blocking portions;
   allowing the electrically conductive non-magnetic material at the radially external edges of the flux-blocking portions to cool down to thereby form electrically conductive bars to electrically connect short-circuit rings to one another at end faces of the laminated core,
   forming by the conductors a cage having an outer circumferential surface, and extending the conductors to the outer circumferential surface of the cage and exposing them radially outwardly at the outer circumferential surface of the cage so that each two of the conductors are located at two opposite ends of each of the flux-blocking portions as considered in a direction which is transverse to the axial direction, and each of the conductors has an outer circumferential surface coinciding with the outer circumferential surface of the cage and extending over a part of the circumferential surface of the cage.

9. The method of claim 8, wherein the flux-blocking portions are non-magnetic.

10. The method of claim 8, further comprising providing the specified amount of electrically conductive non-magnetic material in a short-circuit ring shell which is open radially inwards and ends axially with the laminated core at the radially external edges.

11. The method of claim 8, further comprising preheating the laminated core before casting the conductive non-magnetic material.

12. The method of claim 8, further comprising forming each of the flux-conducting portions with two opposite ends extending to the outer circumferential surface of the cage and having outer circumferential surfaces coinciding with the outer circumferential surface of the cage so that the outer circumferential surface of the cage is formed by the outer circumferential surfaces of the flux-conducting portions and the outer circumferential surfaces of the conductors are arranged in alternating order without an intermediate element there between.

13. A synchronous reluctance machine, comprising a rotor, said rotor comprising
   a laminated core defining an axis and having end faces, said laminated core having sheets which are at least partly axially layered, said sheets having flux-conducting portions and flux-blocking portions to form a specified number of poles, and
   a cage made of electric conductors running in a substantially axial direction and connected at the end faces of the laminated core by short-circuit rings, said conductors being located in a radially outer region of at least some of the flux-blocking portions arranged one behind another substantially in the axial direction so that each two of the conductors are located at two opposite ends of each of the flux-blocking portions as considered in a direction which is transverse to the axial direction, with the conductors defining conductor bars formed by conductive material at a quantity determinative to define an internal diameter of the conductor bars,
   wherein the cage has an outer circumferential surface, and the conductors extend to the outer circumferential surface of the cage and are exposed radially outwardly at the outer circumferential surface of the cage, and wherein each of the conductors has an outer circumferential surface coinciding with the outer circumferential surface of the cage and extending over a part of the circumferential surface of the cage.

14. The synchronous reluctance machine of claim 13, constructed for operation directly on an electric supply network.

15. The synchronous reluctance machine of claim 13, wherein the flux-blocking portions of the sheets are non-magnetic.

16. The synchronous reluctance machine of claim 13, wherein the poles of the rotor are axially parallel, beveled or skewed in the axial direction.

17. The synchronous reluctance machine of claim 13, wherein the laminated core has laminated-core assemblies arranged in axial staggered relationship, with the flux-blocking portions of the laminated-core assemblies being rotated about a specified angle such as to enable an axial design of an axially continuous electrical conductor.

18. The synchronous reluctance machine of claim 13, wherein the rotor includes a short-circuit ring shell configured to surround at least one of the short-circuit rings.

19. The synchronous reluctance machine of claim 13 for use as individual or group drives.

20. The synchronous reluctance machine of claim 13 for use in fans or compressor drives.

21. The synchronous reluctance machine of claim 13, wherein each of the flux-conducting portions has two opposite ends extending to the outer circumferential surface of the cage and having outer circumferential surfaces coinciding with the outer circumferential surface of the cage so that the outer circumferential surface of the cage is formed by the outer circumferential surfaces of the flux-conducting portions and the outer circumferential surfaces of the conductors are arranged in alternating order without an intermediate element there between.

\* \* \* \* \*